US007366617B2

(12) United States Patent
Decker et al.

(10) Patent No.: US 7,366,617 B2
(45) Date of Patent: Apr. 29, 2008

(54) MASS DETERMINATION FOR BIOPOLYMERS

(75) Inventors: Jens Decker, Bremen (DE); Michael Kuhn, Machern (DE); Marcus Macht, Bremen (DE)

(73) Assignee: Bruker Daltonik GmbH, Bremen (DE)

( * ) Notice: Subject to any disclaimer, the term of this patent is extended or adjusted under 35 U.S.C. 154(b) by 732 days.

(21) Appl. No.: 10/292,374

(22) Filed: Nov. 12, 2002

(65) Prior Publication Data

US 2003/0129657 A1 Jul. 10, 2003

(30) Foreign Application Priority Data

Nov. 13, 2001 (DE) ................................ 101 55 707

(51) Int. Cl.
*G06F 19/00* (2006.01)

(52) U.S. Cl. ............................ 702/19; 702/23; 702/27; 702/32; 702/189; 250/281; 436/86

(58) Field of Classification Search ................... 702/32
See application file for complete search history.

(56) References Cited

FOREIGN PATENT DOCUMENTS

EP 1 047 107 A2 10/2000
GB 2 308 917 A 7/1997
WO WO 01/79523 A2 10/2001

OTHER PUBLICATIONS

Bruce et al. Obtainig More Accurate Fourier Transform Ion Cyclotron Resonance Mass Measurements Without Internal Standards Using Multiply Charged Ions. Journal of American Society for Mass Spectrometry. May 2000, vol. 11, pp. 416-421.*
Mann, M., "Useful Tables of Possible and Probable Peptide Masses", 43rd ASMS Conference on Mass Spectrometry and Allied Topics, p. 639, 1995.

* cited by examiner

*Primary Examiner*—Carolyn L. Smith
(74) *Attorney, Agent, or Firm*—Law Offices of Paul E. Kudirka

(57) ABSTRACT

A method for determining the masses of ions of a sample that contains a known class of biopolymers and is measured with a mass spectrometer having a statistical or pseudo-statistical error distribution includes acquiring a mass spectrum of ions of biopolymers of the known class in the sample in which mass spectrum the mass values of ions of biopolymers from the known class are concentrated in known distributions around a set of most probable mass values. At least one measured mass value of the mass spectrum is replaced by that one of a set of most probable mass values that is nearest to the measured mass value, or by a weighted average of the measured mass value averaged with that one of the set of most probable mass values that is nearest to the measured mass value.

18 Claims, 2 Drawing Sheets

MASS DETERMINATION FOR BIOPOLYMERS

FIELD OF THE INVENTION

The invention relates to the mass-spectrometric determination of the masses of biopolymers or their fragments without the use of internal or external reference substances.

BACKGROUND OF THE INVENTION

Mass signals in mass spectrometers are generally measured as a function of the scan time or the time of flight. The times of the appearance of these signals are then converted into masses via a so-called calibration curve. The accuracy of the mass determination is not always satisfactory, it is dependent on the type of mass spectrometer and the ionization method being used. In this context, "accuracy" is defined as the width of the error distribution. "Error" is the deviation between the measured mass value and the true mass value. The scattering of mass values around the true value is referred to here as the error distribution. One measure of the error distribution is the "standard deviation", but a clearer way of expressing this is the "error distribution width" measured as the full width of the error distribution at half-maximum (sometimes abbreviated to FWHM).

Mass spectrometers can only ever measure the "mass per elementary charge" m/z of an ion. It is therefore crucial that the charge is determined in a known way and corrected for in the mass determination under discussion here. There are so-called deconvolution methods known in mass spectrometry to calculate true mass spectra from m/z-spectra containing ions with multiple elementary charges, taking into account the multiple numbers of protons in multiply charged ions.

From the work of Mathias Mann, it is known that peptides and proteins cannot assume all possible fractional mass values, but concentrate themselves in narrow distributions around average mass values. These average mass values are 1.00048 atomic mass units (amu) apart and have a distribution width of approximately 0.2 mass units (Proceedings of the $43^{rd}$ ASMS Conference on Mass Spectroscopy and Allied Topics, Atlanta, Ga., USA, 1995, Page 639). A "straight line of best fit" on which the average values of the distributions lie can be easily constructed from these distances. The average values represent the "most probable" mass values for peptide ions.

In appropriate mass spectrometers, this knowledge can be used for recalibration and can therefore be used to improve the mass determination. A precondition for this is that the mass spectrometer has a "smooth" calibration curve which is described well by a mathematical function such as a low-order polynomial. If systematic errors of the mass values appear under these circumstances and can be attributed to the ionization process, affecting all ions to an equal extent, recalibration can be used. An example of this is MALDI time-of-flight mass spectrometers where there are fluctuations in the initial energy of the ions caused by the ionization by the matrix-assisted laser-desorption (MALDI) process, in spite of the spectrometers having very smooth calibration curves. The fluctuations in initial energy systematically leave their impression on the mass determinations.

For this recalibration, the measured masses are first replaced by the most probable masses arising from the above distances (i.e. from the "line of best fit") and a mathematical best-fit curve is plotted through these most probable masses and associated scan times according to a method such as the method of minimum quadratic deviation. In other words, the most probable mass values are treated as a large number of reference masses. The curve therefore represents a most-probable calibration curve and the measured masses are "recalibrated" using the most-probable calibration curve just constructed. The recalibration procedure eliminates the systematic errors which occur in the mass spectrometer.

In some recent work the masses of peptides and their distribution were analyzed more accurately than was possible with the theoretical precalculation of M. Mann. By virtual tryptic digestion of all digestion peptides from a large protein sequence database, it is possible to determine the average masses of all the digestion peptides produced by the enzyme trypsin and determine their distribution widths. This produces average masses with an averaged mass separation of 1.0045475 atomic mass units in each case with a distribution width of only about 0.1 mass units for a mass of 1000 (S. Gay, P-A. Binz, D. F. Hochstrasser and R. D. Appel, Electrophoresis 1999, 20, 3527-3534). FIG. 1 shows typical distributions ranging over two mass units. The inclination of the "straight line of best fit" with this calculation method is slightly different to the one given by Mann.

On closer inspection of the individual average masses of peptides and proteins, it can be seen that the average mass values deviate characteristically from the "straight lines of best fit". As shown in FIG. 2 for the mass range from about 300 to 1400 atomic mass units, the deviations show a period of 14 mass units; in this case, the amplitude of deviation of this period decreases from about 60 millimass units (peak-peak) toward the higher masses and disappears altogether at about 1400 mass units. Beyond 3000 mass units, statistical deviations appear in the individual average mass values which increase in size toward the higher masses but do not have any recognizable periodicity, as seen in FIG. 3.

These individual deviations in the peptide masses can be used for a more accurate recalibration by using the individual average values for the mass numbers instead of using the value for the "straight lines of best fit" for the recalibration process. (In this context, the "mass number" is the nucleon number, i.e. the number of protons and neutrons counted together).

In a similar way, average values for the masses can be calculated for other classes of biopolymers by combinatorial analysis or by virtual digestion of sequences in databases. Such classes may include glycoproteins, lipoproteins, saccharines or DNA etc. The proteins from mammals and the proteins from bacteria can be regarded as two separate classes since the proteins from bacteria have a different proportion of the various amino acids and therefore show slightly different average mass values. Some of the biopolymers of certain selected classes have distribution ranges around the individual average mass values which are even narrower than those of the proteins, and are therefore even more accurate.

However, the methods for recalibration described cannot be used if the mass spectrometer yields statistical or pseudostatistical error distributions in the mass determination. "Pseudostatistical error distributions" in this context means those mass errors which, although they can be reproduced from scan to scan, always show relatively large differences between the measured and true masses. These differences deviate positively and negatively along the mass scale and therefore cannot be represented by a smooth calibration curve.

Mass spectrometers which show this behavior include, for example, high-frequency ion trap mass spectrometers, where the pseudostatistical deviations may be caused by tiny fluctuations in the control of the high-frequency scan. Other causes may also be the effects of the space charge and the order structure within the ion cloud on scanning behavior and therefore the mass determination.

However, there are other mass spectrometers which also show the phenomenon of statistical or pseudostatistical mass deviation.

SUMMARY OF THE INVENTION

The invention consists in simply replacing, in those mass spectrometers which produce relatively inaccurate measurements, the measured mass values after usual calibration by the most probable mass values for the class of substance being examined. Thus the invention is applicable for mass spectrometers of low accuracy in mass determination. An improvement in the mass accuracy is automatically achieved when the width of the error distribution in the mass spectrometric mass determination is larger than approximately half the distribution width of the true mass values at a mass number for a certain class of biopolymers. Depending on the class of substances, the width of the error distribution in the results may drop to values below a tenth of a mass unit (amu).

Using the mass values of the "straight line of best fit" as the most probable mass values can already bring a considerable improvement. Here, the calculation of the most probable mass follows a very simple mathematical procedure (calculating values of a straight line) which can be carried out at high speed. However, if known, the average values for the individual masses which are stored in a table can also be used. These values are obtained either by a mathematical combinatorial analysis, or by a virtual digestion or a virtual fragmentation of substance sequences in a database. Using these individual average values for the individual mass values results in further considerable improvement.

For the mass spectra of digestion peptides of proteins, for example, either a virtual digestion of known proteins which are stored in a database can be carried out, followed by exact mass calculations of the digest peptides, and by calculating the average masses of the peptides for each mass number. Or the combinations can be calculated from a large number of amino acids and the average mass values and distributions can be determined from these for the individual mass numbers. For the combinations, the statistical frequencies of the amino acids and even the properties of the peptides produced by the digestion enzyme can be taken into account. For the virtual digestion, it is possible to use virtual digestion procedures to virtually cleave the proteins at different points exactly in the same manner as the real enzymes cleave the real proteins for the measurements.

When scanning the daughter-ion spectra of fragmented ions, the mass values can be determined in analogues modes either by virtual fragmentation according to known fragmentation rules or by combinatorial analysis. Particularly in the lower mass range, and especially for the so-called b fragments, the fragment masses have somewhat different average values to those of the digestion peptide ions.

Instead of using a table of the most probable average values stored for the masses, the periodicity and its decreasing deviation amplitude (as with proteins) can also be approximated by means of a mathematical equation and the equation then can be used in turn to calculate the most probable average mass values for the measured spectra. Different equations may be used for different parts of the mass range.

It is also possible to correct the measured masses if the statistical or pseudostatistical error distributions of the masses produced by the mass spectrometer are only relatively small and account for only part of the fluctuations, the remainder of the fluctuations of the true masses leaving their mark on the measured fluctuations. In this case, the measured masses are first replaced by the most probable mass value, i.e. the individual average value, but are then corrected toward the measured value using a previously established fraction of the difference between the most probable value and the measured value. This fraction can also be defined according to the masses. Mathematically, the method represents the utilization of a weighted average value of the measured mass values and the most probable mass value.

If the mass spectrometer also tends to produce systematic errors caused by phenomena such as temperature drift, these errors can be eliminated by recalibration as described above, before using the invention.

With proteins, the improvements in mass accuracy which are achieved by using this invention lead to surprising improvements in the identity search using the conventional search machines in protein sequence, EST or genome databases. The search is often faster by an exceptionally large margin, but also leads to results which are significantly more reliable due to the larger distances between the quality coefficients (scores) to the next best results for other types of proteins. The results obtained by these search machines appear to respond particularly sharply to an improvement in the search tolerance of values which are greater than a half mass unit to values of approximately 0.2 to 0.3 mass units, presumably because, by so doing, the erroneous trapping of peptides with neighboring masses is prevented.

DETAILED DESCRIPTION

Figure 1:
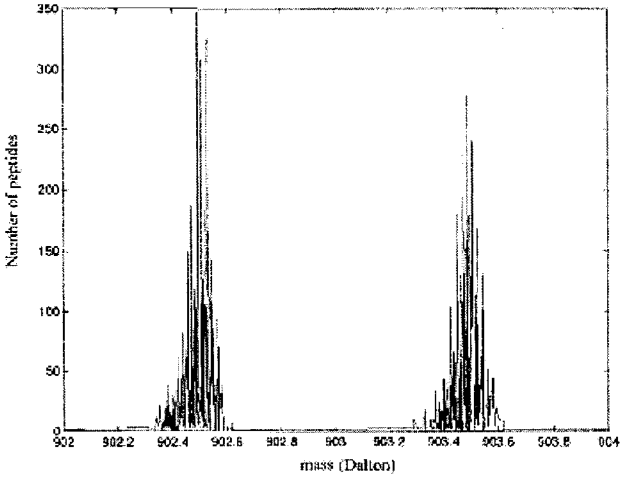
FIG. 1 shows the frequency distribution of peptide masses in a mass range from 902 to 904 atomic mass units obtained by a typical virtual digestion of the SwissProt protein-sequence database (S. Gray et al., cited above).
Figure 2:
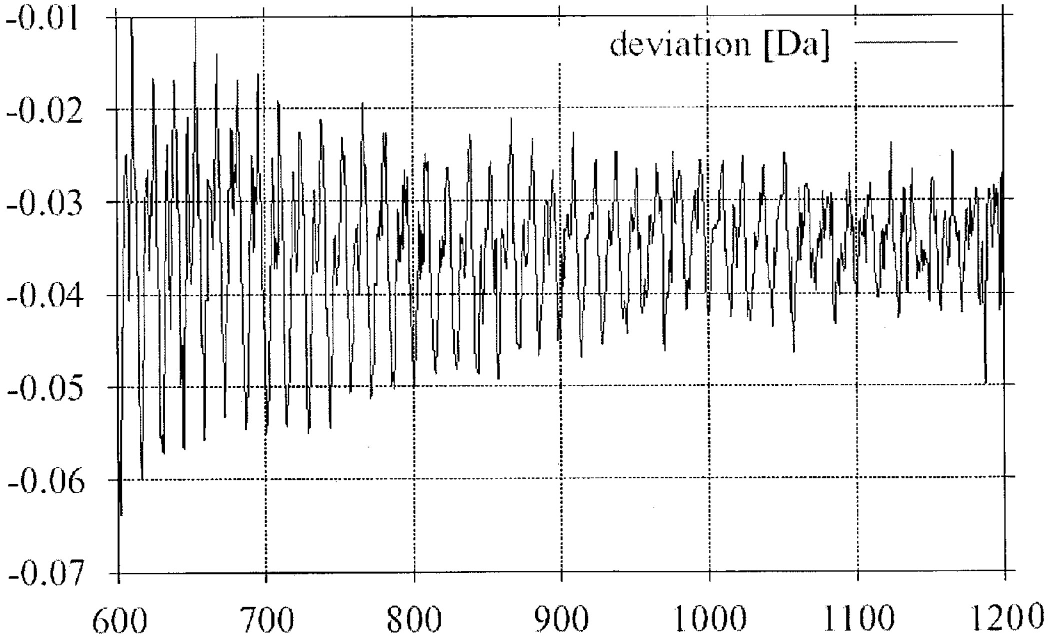
FIG. 2 shows the mass deviations of digestion peptides which have been obtained by virtual tryptic digestion of the SwissProt database in the section which ranges from mass 600 to 1200 atomic mass units. The figure is a section of FIG. 3.
Figure 3:
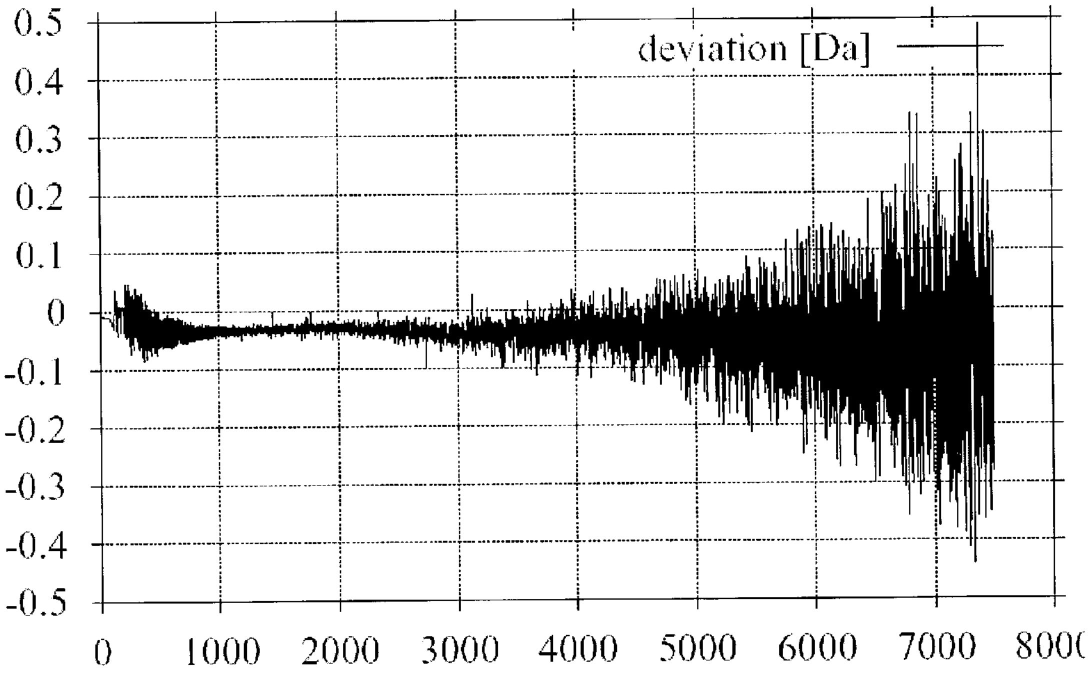
FIG. 3 shows the mass deviations as a function of the line of best fit in the mass range from 1 to 7500 atomic mass units.

The invention is based on the findings exhibited in FIGS. 1 to 3, showing that the true masses of peptides do not cover a continuous band of masses, but only narrow peaks for each number of nucleons in the peptide.

FIG. 1 shows the frequency distribution of all peptide masses in a mass range from 902 to 904 atomic mass units obtained by a typical virtual digestion of the SwissProt protein-sequence database (S. Gray et al., cited above). An average value and a distribution range can be constructed from these values for each mass number. The distribution width (FWHM) is only approximately 0.1 atomic mass units wide and a good three quarters of the mass range is empty, i.e., no peptide masses can occur here at all. For each mass number, i.e., for each integer number of nucleons, there is a distribution which reflects the average masses of the nucleons and the distribution of the mass values. The distribution of mass values stems from the different nuclear binding energies of the elements and their isotopes and the resulting molecular weights. All the nucleons have only approximately a mass of one atomic mass unit each. (Nucleons are protons or neutrons which, when fused together in the nucleus of the elements, lose a certain amount of mass corresponding to the binding energy in the nucleus. These binding energies are the reason why the different isotopic weights of the elements deviate from the integer number for the element.)

FIG. 2 shows the mass deviations of digestion peptides which have been obtained by virtual tryptic digestion of the SwissProt database in the section which ranges from mass 600 to 1200 atomic mass units (own work). The mass deviations are deviations from the line of best fit according to M. Mann. A period of the deviations over 14 mass units can be seen. It subsides toward higher masses. The figure is a section of FIG. 3.

FIG. 3 shows the mass deviations from the line of best fit in the mass range from 1 to 7500 atomic mass units. In the lower mass range below a mass of 1400 atomic mass units (see FIG. 2), there is a periodicity over 14 mass units; in the mass range above 3000 mass units, the statistical deviations are non-periodic. For the measurement of digestion peptides, only the mass range up to 3000 mass units is usually of interest, and measurements beyond this range are rather rare. But here too, improvements in the mass accuracy can be achieved by using the method according to the invention.

The mass unit Da (Dalton) used in the figures is an obsolete unit but has been revived in molecular biology. Although originally defined otherwise, it is now used like the "unified atomic mass" (abbreviated in Germany to "u", in the English-speaking countries to "amu") which is legally specified as a "non-coherent SI unit".

The invention improves the accuracy of the mass determination of ions from a known class of biopolymers using a mass spectrometer of low accuracy. The method of the invention comprises the following steps:

(a) acquiring a mass spectrum of the molecular ions or fragment ions of biopolymers,
(b) deconvoluting the spectrum, if the spectrum contains signals of ions with multiple charges,
(c) assigning mass values to the spectrum signals, and
(d) replacing these measured mass values each by the nearest most probable mass value for the class of biopolymers, or by a weighted average value of the measured value and most probable mass value.

A mass spectrometer dedicated for the measurement of the masses of biopolymers according to the invention comprises the following parts and means:

(a) a mass spectrometer with an ion source for the generation of ions from biopolymer molecules, a separator separating the ions according to their m/z-values, and an ion signal detector,
(b) computational means for deconvolution, if necessary, and mass assignment of the measured ion signals, and
(c) computational means for replacing the assigned mass values by the most probable mass values of the biopolymer ions.

The invention will be first described for protein analyses with a high-frequency ion-trap mass spectrometer. These instruments are ideally suited to protein analyses since they can be linked to liquid chromatographic separation methods via electron-spray ion sources for the digestion peptides originating from protein mixtures and because they are also able to measure the spectra of daughter ions or even granddaughter ions which are produced in the ion trap by collision-induced fragmentation via a so-called tandem-in-time method. The daughter ions are also called fragment ions. The fragments produced in the ion trap by low-energy collisions are particularly suitable for the identification of proteins by searching protein databases.

These ion trap mass spectrometers are usually equipped with electro-spray ion sources which produce, beside singly charged ions, also large numbers of multiply charged ions. In this case, the m/z-spectra have first to be deconvoluted to spectra with singly charged ions only (or even virtual spectra with pure molecular weights). These deconvolution procedures are well-known in the field. They take into account that multiply charged ions carry more or fewer protons than singly charged ions because of multiple protonation or deprotonation. The invention is then applied to the deconvoluted spectra.

The commercially available so-called search machines (program systems which are used for searches in protein sequence data bases) operate better the narrower the mass tolerance can be chosen, i.e., better the true masses of the peptides or peptide fragments are represented by the measured masses. One indication of "better operation" of the search machines is the quality coefficients (scores) for the proteins found. Another is the time required for the search. The time taken for the search is a decisive factor especially when searching in the genome, for which the search has to be carried out in all three reading frames.

Now, unfortunately, the mass accuracies which can be obtained in ion-trap mass spectrometers are not especially good. The reasons for this are not known in detail but may be that during the high frequency voltage scan, which may amount to some tens of kilovolts, tiny control fluctuations may occur which, although being reproducible from scan to scan, may produce tiny positive and negative deviations of the order of 0.01% from the desired linear scanning curve. For masses of 1000 mass units, 0.01% represents 0.1 atomic mass units, or in the case of a mass of 3000 mass units, a deviation of 0.3 mass units. These deviations in the high frequency voltage from the target value correspond directly to the deviations in the masses being measured. The control fluctuations cannot be compensated for by fitting a mathematical function, since it would be necessary to use a polynomial of such a high order that the errors caused by the mathematical compensation would be greater than the errors which already exist.

However, other causes of statistical errors in the mass determination using ion traps are the effects of the space charge and effects of the order structure within the ion cloud on the scanning behavior and, therefore, on the mass determination. It is known that the ions within the ion cloud can take on an ordered, semicrystalline arrangement, which holds the ions within the cloud so that excess energy must be applied to eject them. They appear later at the detector which wrongly indicates a slightly heavier ion mass than the true mass. The order structures appear when there are free areas in the spectrum, i.e. when no ions are ejected during the scanning process over a certain period of time. In this case, the cloud is not "stirred up" by oscillating ions and can therefore partially crystallize out.

The peptide ions produced by electron spray are predominantly singly, doubly and triply charged. Although it is possible to search directly with some search machines using these spectra, in order for the search to be tolerably fast, the spectra must first be converted to spectra for singly charged ions by a mathematical procedure called deconvolution. However, in spite of the fact that this conversion usually averages between the different mass determinations, it can again contribute to a slight decrease in accuracy.

Although ion-trap mass spectrometers show statistical mass deviations with an error distribution range sufficiently large to interfere, they do give very stable results. Within a mass error of about 0.3 mass units, the results are very reliable.

The invention which is presented here can now be used for improving the mass accuracy. The mass values obtained from the measured ion signals for the ion masses are simply replaced by the nearest most probable mass values for this class of substance. The invention is usually applied to the deconvoluted spectra. Since the distribution of all possible individual mass values around the average has a very small width of less than one tenth of a mass unit for bio-polymers, the large width of the error distribution of the mass spectrometer is improved to this naturally occurring distribution width (see FIG. 1). The reason for the improvement therefore is that the substance class of the measured substances is known and that no mass values outside these natural distribution widths can exist within this substance class.

As an example we refer to the knowledge of the building plans of a housing estate. From the plans of a certain housing area we may know that there are three types of houses which are precisely 7.80 m, 9.00 m and 10.20 m wide. If we now roughly measure by steps the front of a particular house to be approximately 8 meters, then we know with certainty that this house is 7.80 m wide. This knowledge relies on the fact that the building workers have built the houses with greater precision than our method used to measure the house by steps, and that we can rely on our measurements to have an error no greater than 0.3 m.

Since the mass tolerance values for the search machines, which previously had to be a whole mass unit for these mass spectrometers, can now be reduced to approximately 0.3 mass units, the scores arising from the search machines for their findings will suddenly increase by a factor of 2 to 3. In particular, the distance of the scores from the next unrelated proteins is significantly greater, i.e. the risk of obtaining erroneous positive identifications is reduced and the identification is more reliable.

In practice, a large improvement in the accuracy of the mass determination is already achieved when the measured values for proteins are replaced by the mass values of the straight line of best fit according to M. Mann. According to M. Mann, the line of best fit for proteins is characterized by an average single-mass value separation of 1.00048 atomic masses. Other lines of best fit can be entered for other classes of biopolymers. The separations of the lines of best fit are easily obtained by the averaged composition of the biopolymer class from the elements, multiplied by the precise molecular weights of the elements, divided by the averaged number of nucleons in the averaged composition. The separations correspond to the averaged nucleon weight for this class of biopolymers. (Nucleons are the protons and neutrons counted together).

The mass determination of biomolecules can be made more accurate still by using the individual average values of the individual masses produced by investigating suitable databases—for example, by virtual tryptic digestion, then storing all the masses in a kind of histogram (as seen in FIG. 1) followed by a statistical evaluation of all the digestion masses of equal mass numbers. The resulting individual average mass values can, for example, be saved in a table. For proteins in the lower mass range, the individual average mass values present a periodicity of 14 mass units for the deviations from the line of best fit, as shown in FIG. 2.

Individual average mass values can also be obtained by mathematical combinatorial analysis. For proteins, and peptides and particularly for peptide fragment ions, which are produced to scan daughter-ion spectra by collision fragmentation or other types of fragmentation, the individual average mass values can be obtained calculating large numbers of combinations of the 20 possible amino acids. During this process, the relative frequencies of amino acids found in nature in particular—in a borderline case, those found in the species being examined—can be used. For other types of biopolymers, the building blocks of the biopolymers, i.e. the different types of monomers, are used for such a combinatorial analysis.

For daughter-ion spectra, it is not the digestion peptide masses which are the decisive factor but the masses of the fragment ions which are obtained from them. The fragmentation of peptides obeys relatively simple rules. These rules and the nomenclature of peptide fragments in the form of a-, b-, c-, x-, y-, z-, i-, d- and w-fragments which are used today can be found in the work of Fohlmann et al. (1988) Int. J. Mass Spectrom. a. Ion Proc. 86, 137. Almost the only fragments which occur in ion trap mass spectrometers are b- and y-fragments and, on very rare occasions, a-fragments.

The average mass values of the fragment ions can be determined by virtual fragmentation (analogues to the virtual digestion described above) of a large number of virtually produced digestion peptides from a protein-sequence database, but also by mathematical combinatorial analysis of the amino acids, taking into account the fragmentation rules. The b-fragmentation ions have a slightly different average nucleon weight to the y-fragment ions. When carrying out the mathematical combinatorial analysis, it must be taken into consideration that a few of the amino acids may also exist in a different form, such as methionine in the oxidation state. It appears that the average mass values in the mass range above approx. 400 atomic mass units practically agree with those of the digestion peptides. The lower range has the following characteristics:

a) Below the mass of 68 atomic mass units, there are no peptide or fragment masses.
b) In the range from 68 to approximately 130 mass units, there are only the so-called immonium ions (i-fragments) which represent single amino acids and only exist at relatively few mass numbers.
c) In the mass range up to 400 mass units, many gaps are found, i.e., there are masses for which there are no fragment masses at all; the gaps become fewer in number when rare amino acid modifications such as methylation or amidation are included.
d) In the mass range up to 400 mass units, some masses are found for which there is only a single peptide or peptide-fragment mass.
e) An average value is only generated if there are two or more mass values.

By replacing the measured mass values by the nearest-by most probable mass values according to the invention, the precise mass value is used for those masses for which there is only a single mass value instead of the average value usually used. This increases the mass accuracy within this range immensely. For the gaps, the value of the straight line of best fit (or a value which takes into account the periodicity) is used for expediency, since it is not possible to exclude rare modifications of amino acids producing this mass and so this calculated value is still the most probable.

For masses for which there are only two mass values which are relatively far apart, both values can be stored in a table and the nearest stored mass value can be used as the substitute. A similar procedure can be used when there are clearly two peaks for the mass distribution at one mass number.

The periodicity of 14 mass units found for proteins in the range up to 1400 mass units can be found for all classes of organic substances. It is based on the periodicity of the hydrocarbon components, which always predominate and which are only fully saturated with hydrogen every 14 mass units, while the masses in between can only be formed from unsaturated hydrocarbons. In other words, the average hydrogen component fluctuates. The saturated hydrocarbons have the formula $C_nH_{2n-2}$, while the unsaturated hydrocarbons lack a few hydrogen pairs $H_2$. Since hydrogen at 1.008 atomic mass units per nucleon is relatively heavier than carbon (12.0000 atomic mass units with 12 nucleons for the isotope $^{12}C$), the saturated hydrocarbons are relatively the heaviest and the unsaturated hydrocarbons are relatively significantly lighter. If, for example, an unsaturated hydrocarbon lacks 7 hydrogen pairs (14 mass units), then this unsaturated hydrocarbon is lighter by 14×0.008=0.112 mass units than the saturated hydrocarbon for the same mass number which has one methyl group $CH_2$ less (likewise 14 mass units). Leucine and isoleucine in particular are the most hydrogen rich amino acids.

The periodicity of the mass deviations in biopolymer classes which also contain nitrogen, oxygen, phosphorus and sulfur in different proportions, increasingly disappears toward the higher masses because the increasing proportion of these elements toward the higher masses shifts the mass maximum of the periodicity. Statistically fluctuating proportions of these elements in various substances in this class lead to interferences in the periodic distributions and cause the periodicity to ebb toward the higher masses. At the same time, proportions of unsaturated hydrocarbons do not always have to be present in these classes of substances; the drop in hydrogen content can also be due to ring formations (aromatic rings in particular) or the nature of the incorporation of other elements such as carboxyl groups.

It is possible to include an estimate of these periodic fluctuations of the average mass values in comparison to the straight lines of best fit in an equation and to use this equation for calculating the average mass value which is to be used to replace the measured value.

The method according to the invention is significantly different to the recalibration method described at the beginning. Both methods improve the mass accuracy based on a knowledge of the class of the measured biopolymer. With the recalibration method, a new most probable calibration curve is constructed, which is used to recalibrate the measured mass values. This method produces accuracies in the mass determination which are significantly better than those produced by pure value substitution using the method according to the invention presented here. However, the recalibration method can only be used for measurements using mass spectrometers with inherently high mass accuracy.

On the other hand, the method according to the invention is much simpler. However, it can only be successfully used in such types of mass spectrometers which measure less accurately with relatively high error-distribution widths. The method simply substitutes the measured mass values by the most probable values for the class of substances.

Instead of replacing the measured mass values by the nearest most probable mass values, a somewhat different method can be used. Substitution can be carried out using weighted average values, where the weighted average values are composed of the measured values and the most probable mass values. This substitution is appropriate whenever the distribution of mass values which have been determined by the mass spectrometer not only shows statistical deviations but also when the distribution of the true masses is still leaving its mark. If the true masses only make a small contribution, an average value can be used, for example, the composition of which is ¾ the most probable masses and ¼ measured masses. If the influence of the true masses is stronger, then a half and half average value can also be created. The choice of weighting for forming the average value thus depends on how strong the influence of the true masses is on the distribution of the mass values. If appropriate, the choice of the weighting factors can be made dependent on the masses. For example, in the lower mass range, a larger proportion of the measured masses may be used in the formation of the average value but in the upper mass range an increasingly smaller proportion of the measured masses may be used.

The application of the method according to the invention is not restricted to ion-trap mass spectrometers. It can be used on all mass spectrometers which produce statistically scattered values for the mass determination. For example, the PSD (Post-Source Decay) method for measuring fragment ion spectra in time-of-flight mass spectrometers produces similar error distribution widths to those from an ion-trap mass spectrometer. PSD uses the decomposition of metastable ions to produce the fragment ions. However, in this case, the error distribution widths do not stem from the ionization process but rather from other causes which do not need to be investigated further in this context. Nevertheless, it is interesting that the method according to the invention can also be used very successfully in this case.

For this PSD mass spectrometric method, as for the modem tandem time-of-flight mass spectrometers (TOF/TOF), the method according to the invention is of particular interest in so far as it also measures ions in the lower mass range which are usually missing in the ion-trap mass spectrometers since they lie below the storage boundary for ions. In the lower mass range, immonium ions and other masses occur where only one fragment mass can exist for one peptide in each case. For this reason, the mass accuracy is increased considerably by using the method according to the invention.

The method can be permanently installed in suitable mass spectrometers. According to this invention, mass spectrometers can be built which are especially set up for and dedicated to measuring certain classes of substance, or it can be set up so that the class of substance measured by the spectrometer can be preselected by the operator. The mass spectrometers contain computational means to replace automatically each mass value measured by the nearest most probable mass value. Depending on the kind of ion generation, the measured spectra may first be deconvoluted to take care of signals stemming from ions with more than one elementary charge. A selection means can be provided for selecting the class of substance being investigated and a suitable operating mode. Mass spectrometers dedicated for a certain class of compounds may have a completely fixed mode of operation.

The invention claimed is:

1. A method for generating a set of mass values of ions for a sample containing a known class of biopolymers using a mass spectrometer that has a statistical or a pseudo-statistical mass determination error distribution, the method comprising the following steps:

(a) acquiring a mass spectrum of molecular ions or fragment ions of biopolymers of the known class in the sample with the mass spectrometer, wherein the mass values of all ions of biopolymers from the known class are concentrated in distributions around most probable mass values, (b) assigning measured mass values to ion signals of the mass spectrum to generate a set of measured mass values, (c) generating the set of mass values for the sample from the set of measured mass values by automatically replacing one or more measured mass values in the set of measured mass values, wherein each of the measured mass values is replaced either by that one of the most probable mass values that is nearest to the measured mass value, or by a weighted average value of the measured mass value averaged with that one of the most probable mass values that is nearest to the measured mass value.

2. The method according to claim 1 further comprising determining most probable mass values for some biopolymers in the known class of biopolymers, fitting a straight line to the determined most probable mass values using a best-fit algorithm and selecting a mass value from the straight line as the most probable mass value that is nearest in value to the measured mass value in step (c).

3. The method according to claim 1 further comprising determining most probable mass values for some biopolymers in the known class of biopolymers and selecting a mass value from the determined most probable mass values as the mass value that is nearest in value to the measured mass value in step (c).

4. The method according to claim 1 further comprising determining most probable mass values for some biopolymers in the known class of biopolymers, fitting a straight line to the determined most probable mass values using a best-fit algorithm, determining a periodicity of deviations from the straight line of the determined most probable mass values for the known class of biopolymers and selecting a mass value from the straight line and the periodicity as the most probable mass value that is nearest in value to the measured mass value in step (c).

5. The method according to claim 1 further comprising replacing, in step (c), each of the measured mass values by that one of the most probable mass values that is nearest to the measured mass value.

6. The method according to claim 1 further comprising replacing, in step (c), each of the measured mass values by a weighted average value composed of the measured mass value averaged with that one of the most probable mass values that is nearest to the measured mass value.

7. The method according to claim 6 wherein the weighted average values are calculated by multiplying the measured mass value and that one of the most probable mass values that is nearest to the measured mass value by weighting factors that are the same for all of the measured mass values.

8. The method according to claim 6 wherein the weighted average values are calculated by multiplying the measured mass value and that one of the most probable mass values that is nearest to the measured mass value by weighting factors that differ for at least some of the measured mass values.

9. The method according to claim 1 wherein the biopolymers of the known class are proteins.

10. The method according to claim 1 wherein the biopolymers of the known class are digestion peptides.

11. The method according to claim 10 further comprising obtaining most probable mass values for the digestion peptides by a method selected from one of a virtual digestion of proteins from a protein-sequence database and a mathematical combinatorial analysis of amino acids, and selecting one of the obtained mass values as the most probable mass value that is nearest in value to the measured mass value in step (c).

12. The method according to claim 10 wherein the mass spectrum is a fragment ion spectrum of a digestion peptide.

13. The method according to claim 12 further comprising obtaining the most probable mass values by a method selected from one of virtual fragmentation of peptides from a database and mathematical combinatorial analysis, wherein the selected method comprises known fragmentation rules, and selecting one of the obtained mass values as the most probable mass value that is nearest in value to the measured mass value in step (c).

14. The method according to claim 1 wherein the mass spectrometer is a high-frequency ion-trap mass spectrometer.

15. Apparatus for generating a set of mass values of ions for a sample containing a known class of biopolymers, comprising:

(a) a mass spectrometer with an ion source for the generation of ions from the sample, an ion m/z-separator, and an ion detector that measures ion signals and that has a statistical or a pseudo-statistical mass determination error distribution;

(b) an ion signal processor for assigning mass values to the ion signals measured by the ion detector wherein the assigned mass values of all ions of biopolymers from the known class are concentrated in distributions around most probable mass values, and (c) a spectrum modifier for generating the set of mass values for the sample from the set of assigned mass values by automatically replacing one or more assigned mass values in the set of assigned mass values, wherein each of the assigned mass values is replaced either by that one of the most probable mass values that is nearest to the assigned mass value, or by a weighted average value of the assigned mass value averaged with that one of the most probable mass values that is nearest to the assigned mass value.

16. Apparatus according to claim 15, wherein the spectrum modifier comprises a memory storage unit in which tables with the most probable mass values for a plurality of classes of biopolymers are stored.

17. Apparatus according to claim 16 wherein the spectrum modifier selects the most probable mass values from one of the tables that is stored in the memory storage unit and is associated with the class of biopolymers in the sample.

18. The method according to claim 1 further comprising, between step (a) and (c), deconvoluting the mass spectrum according to multiple charge states of the molecular and fragment ions.

* * * * *